(12) United States Patent
Kruse et al.

(10) Patent No.: US 12,053,868 B2
(45) Date of Patent: *Aug. 6, 2024

(54) OPTICAL QUALIFIER FOR CLAMPING TOOL

(71) Applicant: C.E. Electronics, Inc., Bryan, OH (US)

(72) Inventors: James William Kruse, Harlan, IN (US); Thomas Wayne Manges, Wauseon, OH (US)

(73) Assignee: C.E. Electronics, Inc., Bryan, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,100

(22) Filed: Jul. 18, 2023

(65) Prior Publication Data

US 2023/0356364 A1    Nov. 9, 2023

Related U.S. Application Data

(62) Division of application No. 17/168,286, filed on Feb. 5, 2021, now Pat. No. 11,752,598.

(60) Provisional application No. 62/981,670, filed on Feb. 26, 2020.

(51) Int. Cl.
  *B25B 5/16*   (2006.01)
  *G01B 11/02*  (2006.01)
  *G01S 17/08*  (2006.01)

(52) U.S. Cl.
  CPC ............... *B25B 5/16* (2013.01); *G01B 11/02* (2013.01); *G01S 17/08* (2013.01)

(58) Field of Classification Search
  CPC ......... B25B 5/16; B25B 1/2494; G01B 11/02; G01S 17/08
  USPC ........................................................ 356/614
  See application file for complete search history.

(56) References Cited

U.S. PATENT DOCUMENTS

2003/0127872 A1* 7/2003 Mannhart ................ B25B 5/16
                                                              294/907
2017/0084157 A1* 3/2017 Lucas ..................... F04B 13/02

* cited by examiner

*Primary Examiner* — Sunghee Y Gray
(74) *Attorney, Agent, or Firm* — MacMillan, Sobanski & Todd, LLC; Patrick Pacella

(57) ABSTRACT

This clamping tool uses optical distance verification with a laser. Clamping tools, like all tools, are known to be operated improperly. Many tools verify process completion by monitoring the pressure within the pneumatic tool. Previous qualifiers use pressure to determine many things. However, it often misses if a small object impedes a full stroke. With the addition of an optical laser sensor, we are able to determine if a clamping tool reaches full stroke.

1 Claim, 3 Drawing Sheets

OPTICAL QUALIFIER FOR CLAMPING TOOL

CROSS REFERENCE TO RELATED APPLICATION

The present application is a divisional application of and claims the benefit of U.S. non-provisional patent application Ser. No. 17/168,286, filed Feb. 5, 2021, which claims the benefit of U.S. provisional patent application 62/981,670, filed Feb. 26, 2020. All subject matter contained in the applications are expressly incorporated herein.

TECHNICAL FIELD

This invention relates to a tool monitor and qualifier for a clamp tool. The combination verifies that the clamp tool properly clamps an assembly. The combination also monitors if the clamping has been interrupted.

BACKGROUND OF THE INVENTION

U.S. Pat. Nos. 6,055,484 and 5,937,370 represent a recent, significant development in the field of tool monitoring and assembly qualifying. A programmed microprocessor is configured to identify a signal corresponding to a completed cycle. The configuration also allows for identification of an incomplete cycle and a multiple counting of a completed cycle (double-hit). The qualifier quite nicely tells if a fastener is installed properly and that indicates a fastening process is complete.

U.S. Pat. No. 9,463,539 discloses a system that controls and monitors a wireless clamp tool.

BRIEF SUMMARY OF THE INVENTION

In addition to proper fastening or clamping, the qualifier of this invention uses optical distance verification with a laser. Clamping tools, like all tools, are known to be operated improperly. Many tools only verify process completion by monitoring the pressure within the pneumatic tool. This led to the Qualifier. Previous Qualifiers use pressure to determine many things. However, it often misses if a small object impedes a full stroke. With the addition of an optical laser sensor, we are able to determine if a clamping tool reaches full stroke.

This optical distance verification monitors the stroke of clamping tools during operations. Operation start and completion time is determined by monitoring pressure thresholds. This system evaluates optical distance of stroke at operation completion time. Stroke measurements failing to fall within full stroke tolerances trigger the Qualifier to reject the operation based on proximity laser emitter data.

This system for monitoring comprises a means for measuring air pressure in the tool and converting the air pressure into an electrical signal representative of the air pressure; a means for electrically computationally processing the electrical signal into another signal corresponding to the tool being monitored which is a function of air pressure; and a programmed microprocessor configured to identify the signal representative of the air pressure. The programmed microprocessor is configured to identify and store the parameter of a target air pressure to count a completed cycle when the measured air pressure is in the same as the target air pressure.

The air tool has a body defining a cavity wherein the body has a pressure access port to the cavity and a laser emitter access port to the cavity. The laser emitter access port houses a laser emitter. The laser emitter is a means for measuring a variable distance of measurement. The programmed microprocessor is configured to identify and store the parameter of a target distance of measurement to count a completed cycle when the measured distance is the same as the target distance of measurement.

Other objects and advantages of the present invention will become apparent to those skilled in the art upon a review of the following detailed description of the preferred embodiments and the accompanying drawings.

DETAILED DESCRIPTION OF THE INVENTION

Figure 1:
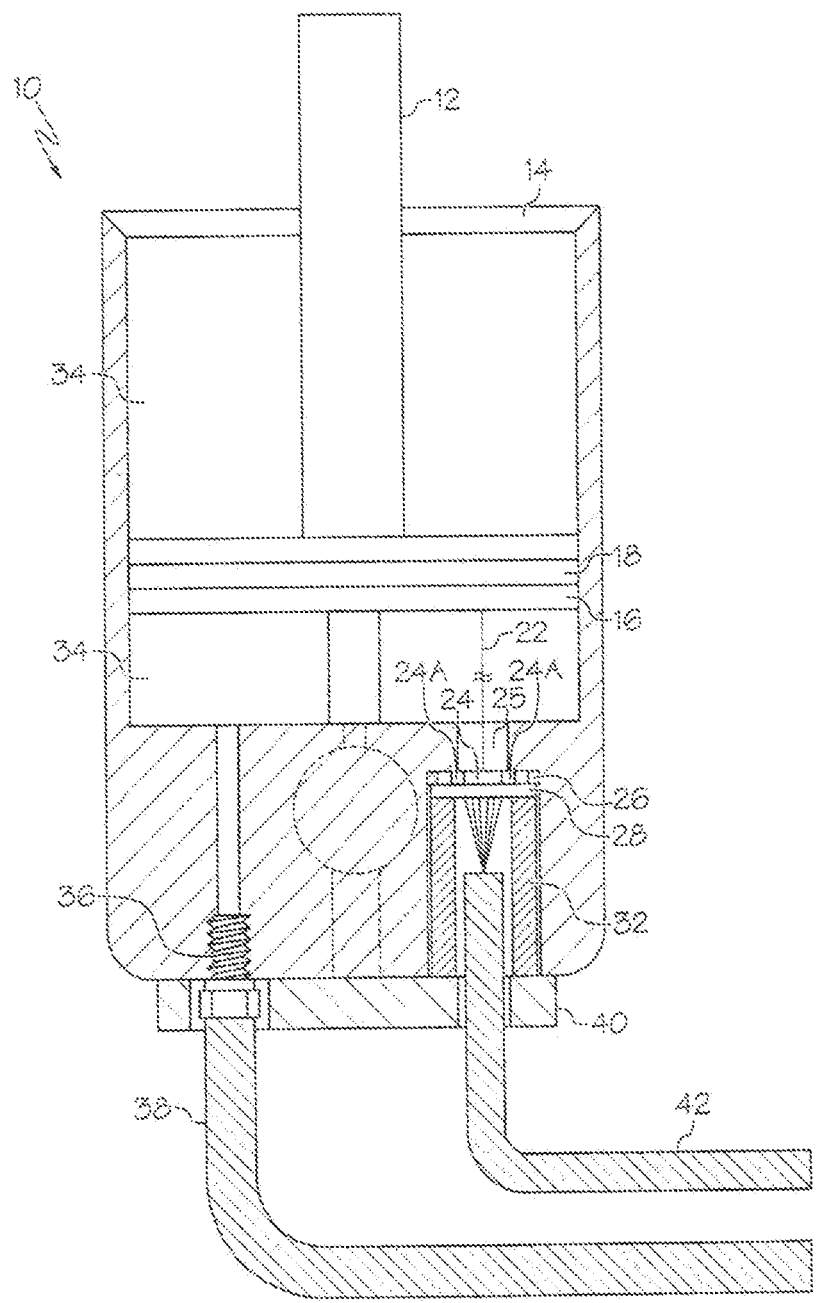
FIG. 1 is a diagram of the air pressure monitor and the optical sensor of this invention mounted into a clamping tool.

FIG. 1 is a diagram of the air pressure monitor and the optical sensor of this invention mounted into a clamping tool 10.

Air clamping tool 10 comprises piston rod 12, cylinder body 14, piston 16 and piston O-ring 18. Also shown is variable distance of measurement 22 between piston 16 and laser emitter 24. O-ring 26 circumscribes laser emitter 24. Cavity 25 communicates with cavity 34, thereby allowing laser emitter 24 to send signals to piston 16. Laser emitter 24 is connected to circuit board 28. Plastic compression spacers 32 separate circuit board 28 from end cap 40. Laser emitter housing port 24A houses laser emitter 24.

The laser emitter is configured to emit a target laser beam. Laser pulses are continuous. The laser emitter communicates a calculated measurement every 10 milliseconds.

The means for measuring air pressure and the means for measuring a variable distance are connected to a data communication port. The data communication port is connected to the programmed microprocessor. The target air pressure ranges from 40 to 90 psi.

This tool and monitor assembly verifies clamps have been installed properly with the tool. The clamp monitoring tool provides accountability and reliability. The tool is designed to perform the operation of a clamp tool, retain the signature and transmit the signal with data to an interface box for error proofing analysis.

The tool uses a pressure transducer and a proximity sensor to provide an accurate representation of the characteristics of the clamp. These are recorded by a microprocessor and analyzed to determine if within predetermined specifications and then transmitted to a receiver. The tool is designed to work with various clamp types. The tool generally clamps, pinches, cuts, and the like.

Figure 2:
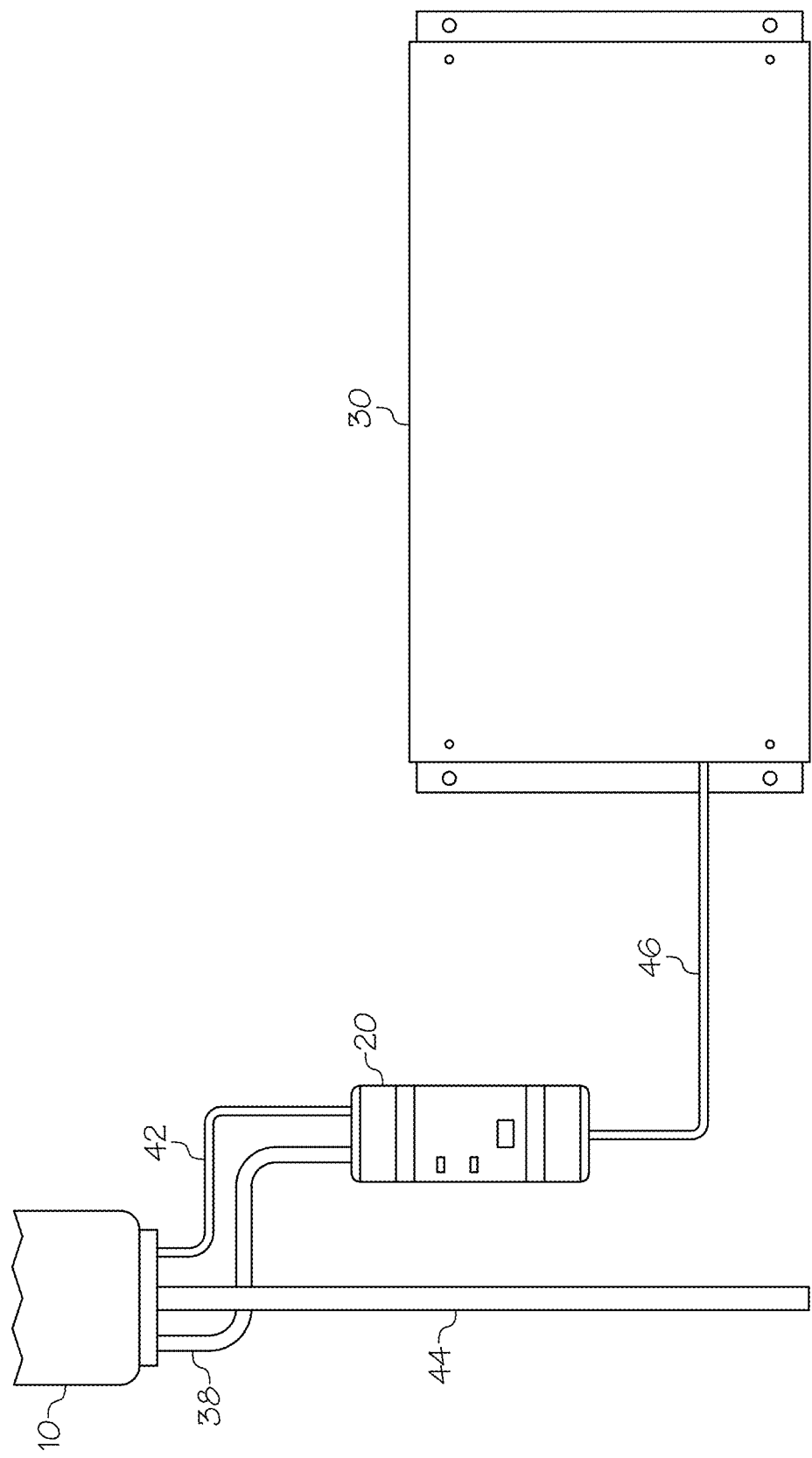
FIG. 2 is a diagram of the entire system of this invention.

FIG. 2 is a diagram of the entire system of this invention. Air clamping tool 10 communicates with assembly qualifier 30 through data communications port 20. Laser measuring cable 42 transmits signals from laser emitter 24 and circuit board 28 to data communications ports 20. Clamping tool 10 also houses cavity 34 and cavity pressure access port 36. Tool air line 44 supplies air to cavity 34. Cable connection 46 connects port 20 to qualifier 30.

Example

This system uses a proximity sensor in conjunction with the pressure to determine if the process was completed.
  a. Proximity can tell us if the piston reached a full stroke.
  b. Pressure alone cannot tell you if the piston reached a full stroke.
  c. By combining proximity and pressure, will allow for more variability in how the operator uses the clamping tool.

Implementation
  1. Hardware:
     a. Started with Simonds air cylinder hand tools with an approximate 1½" stroke.
     b. We added a small circuit board, made by C.E. Electronics, Inc., which incorporated a VL6180X time of flight sensor.
     c. This board was added through the base of the cylinder by milling out a circular opening in which the circuit board was mounted.
     d. The output of the sensor is wired to a data communication board which communicates with the time of flight board and has a pressure sensing module attached.
     e. The data communication board communicates the pressure and distance measurements to a master unit which makes decisions on whether the process passes qualifications or not.
     f. The master unit can also communicate, through Ethernet.
  2. Firmware
     a. Data communication board
        i. Continuously reads the pressure and sends data to the master unit.
        ii. Continuously communicates with the time of flight sensor to determine position.
        iii. We monitor the pressure to determine when an operation has begun.
        iv. Once an operation has begun, distance measurements are gathered every 10 ms.
        v. We continue to gather distance measurements until the pressure determines when the operation has ended.
        vi. Once the operation has ended, all distance measurements collected during the operation are transferred to the master unit.

Figure 3:
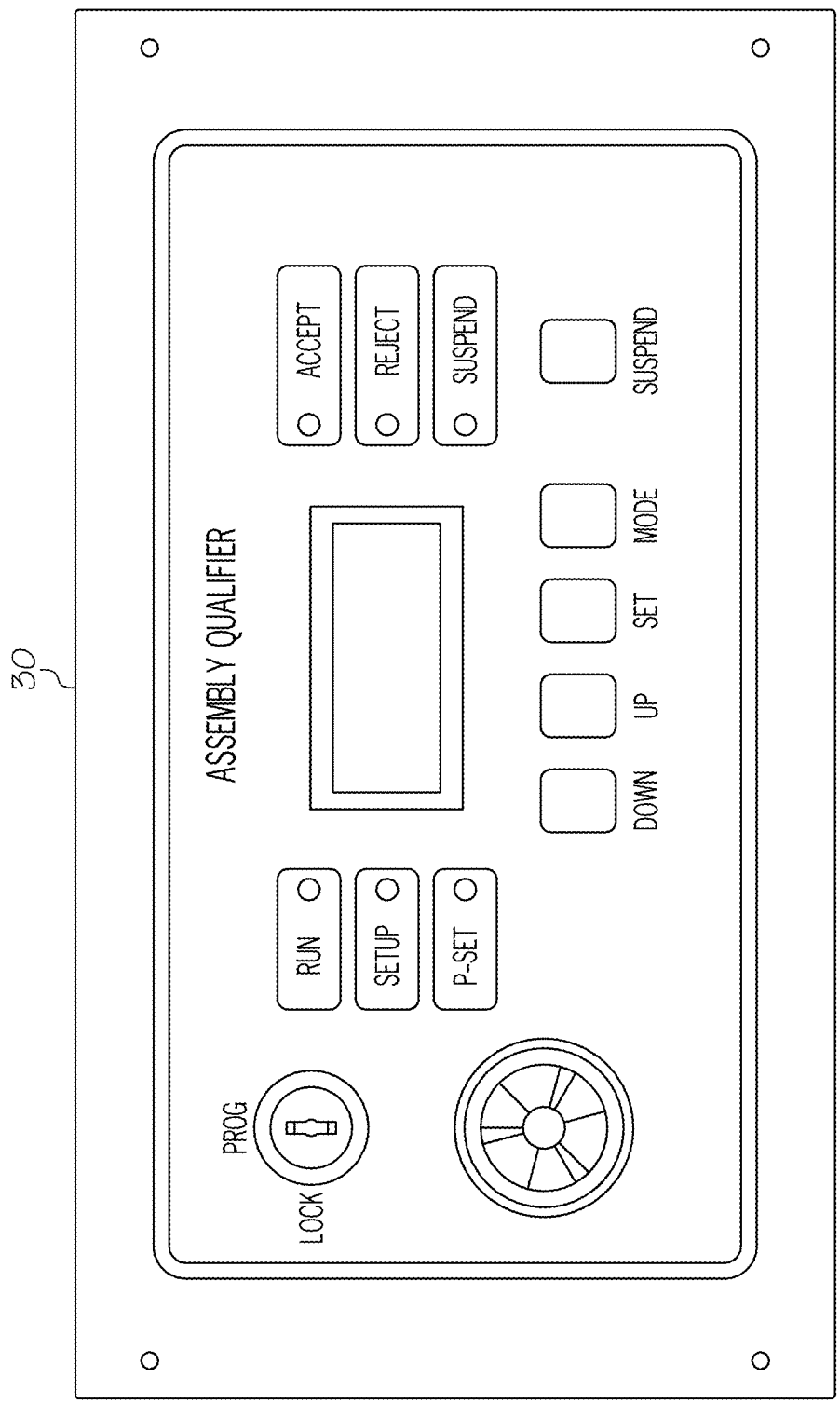
FIG. 3 shows the face plate of the assembly qualifier showing the controls and output signals of the clamping tool being monitored and controlled.

FIG. 3 shows the face plate of the assembly qualifier master unit 30 showing the controls and output signals of the clamping tool being monitored and controlled.
     b. Master Unit
        i. The master unit continuously reads the pressure.
        ii. The master unit monitors the pressure to determine when an operation has begun.
        iii. We used patented pressure qualifying algorithm to determine when the operation has started, stopped, and whether it has passed or failed on pressure alone.
        iv. Once the operation has ended, all the distance data is transferred from the data communication board.
        v. Based on the pressure qualifying algorithm, we determine when the stroke reached maximum distance.
        vi. Using this time and our distance data, we can determine if the piston reached maximum stroke.
        vii. The master unit then communicates this information directly to the assembly process, network or person.
        viii. Communication is done through sound, sight, and data.
     c. Set-up
        i. Initially, the tool is cycled while the assembly line is not running to determine the typical pressure signature and maximum stroke distance.
        ii. This data is then compared to all future cycles.

The above detailed description of the present invention is given for explanatory purposes. It will be apparent to those skilled in the art that numerous changes and modifications can be made without departing from the scope of the invention.

We claim:

1. A system for monitoring and controlling a clamping tool comprising:

An air pressure gauge for measuring air pressure in the tool and converting the air pressure into an electrical signal representative of the air pressure;

a programmed microprocessor for electrically computationally processing the electrical signal into another signal corresponding to the tool being monitored which is a function of air pressure; the programmed microprocessor configured to identify the signal representative of the air pressure wherein the programmed microprocessor is configured to identify and store the parameter of a target air pressure to count a completed cycle when the measured air pressure is in the same as the target air pressure;

wherein the tool has a body defining a cavity wherein the body has a pressure access port to the cavity and a laser emitter access port to the cavity;

wherein the laser emitter access port houses a laser emitter;

wherein the laser emitter is a means for measuring a variable distance of measurement; and wherein the programmed microprocessor also is further configured to identify and store the parameter of a target distance of measurement to count a completed cycle when the measured distance is the same as the target distance of measurement.

* * * * *